United States Patent [19]

Oetiker

[11] Patent Number: 5,768,751
[45] Date of Patent: Jun. 23, 1998

[54] LOW PROFILE EARLESS CLAMP

[75] Inventor: Hans Oetiker, Horgen, Switzerland

[73] Assignee: Hans Oetiker AG Maschinen- und Apparatefabrik, Horgen, Switzerland

[21] Appl. No.: 766,177

[22] Filed: Dec. 12, 1996

Related U.S. Application Data

[60] Provisional application No. 60/020,763 Jun. 28, 1996.
[51] Int. Cl.⁶ .................................................. B65D 63/00
[52] U.S. Cl. .................... 24/20 R; 24/20 CW; 24/23 EE
[58] Field of Search ............................. 24/20 R, 20 CW, 24/23 R, 23 EE, 23 W

[56] References Cited

U.S. PATENT DOCUMENTS

| | | | |
|---|---|---|---|
| Re. 35,384 | 12/1996 | Oetiker | 24/20 CW |
| 4,991,266 | 2/1991 | Oetiker | 24/20 CW |
| 5,138,746 | 8/1992 | Ojima et al. | 24/20 CW |
| 5,191,684 | 3/1993 | Kenwright | 24/20 CW |
| 5,283,931 | 2/1994 | Oetiker | 24/20 CW |

Primary Examiner—Victor N. Sakran
Attorney, Agent, or Firm—Paul M. Craig, Jr.

[57] ABSTRACT

An earless clamp structure in which the clamping band is provided with tool-engaging abutment surfaces for tightening the clamp and a mechanical connection for connecting the overlapping band portions in the completely tightened condition; to avoid lifting up of the free end of the outer band portion during tightening, the latter is provided with a reinforcement in the form of a pressed-out embossment or the like, at least partially surrounding the tunnel-shaped member in the adjoining area of the outer band end portion; a hook-like member for mechanically connecting the overlapping band portions which is provided in the inner band portion has a substantially rectilinear obliquely outwardly extending rear surface adjoined by a substantially flat top portion which is adapted to snap-in from below over the surface of the clamping band portion located at the edge formed by the transverse cut nearer the free end of the outer band portion of the first tunnel-shaped member.

40 Claims, 4 Drawing Sheets

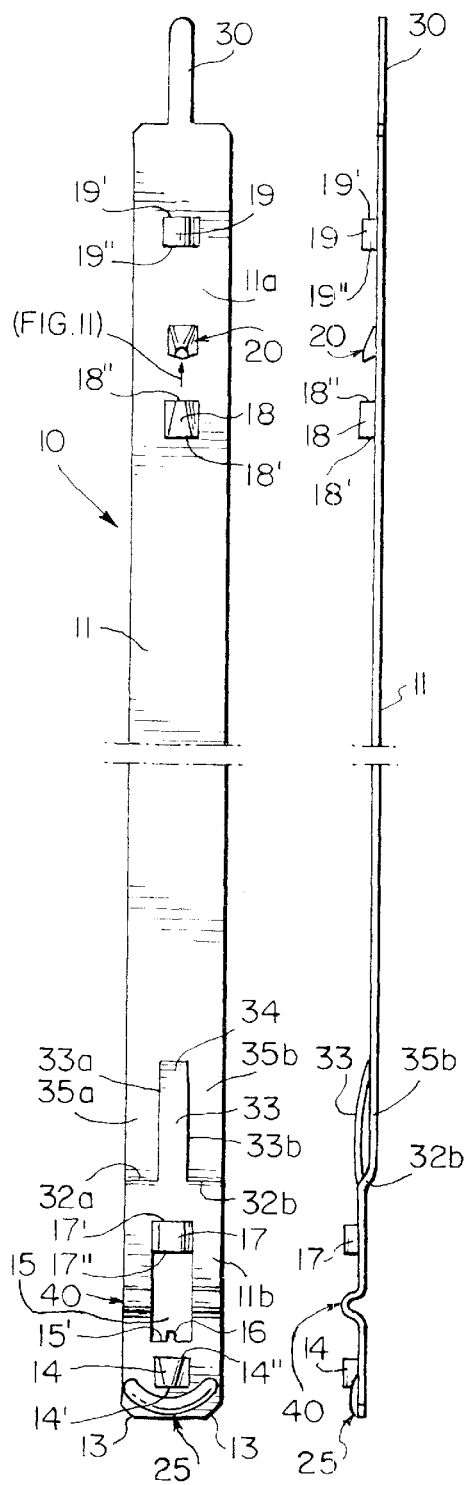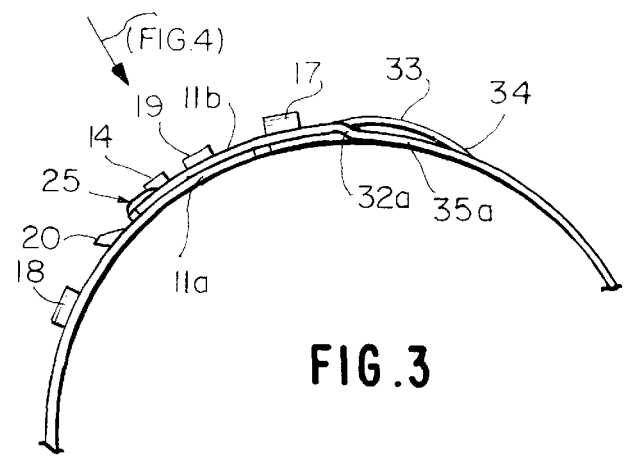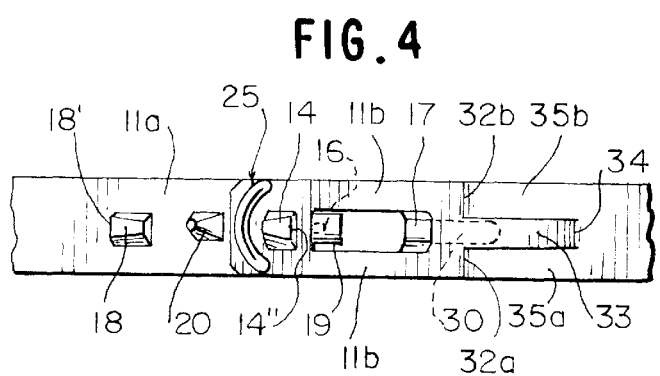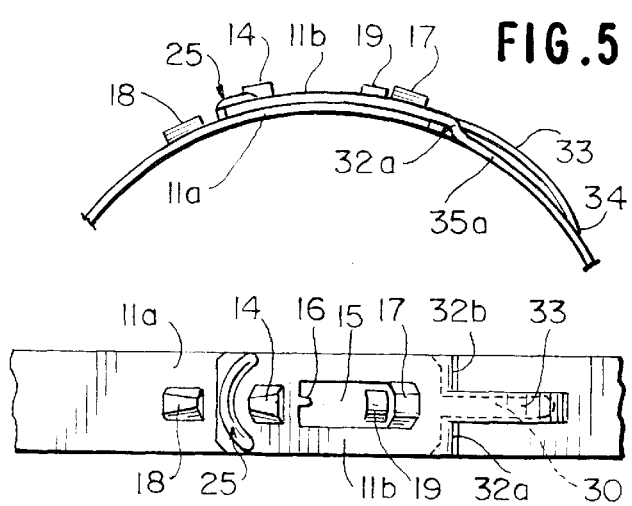

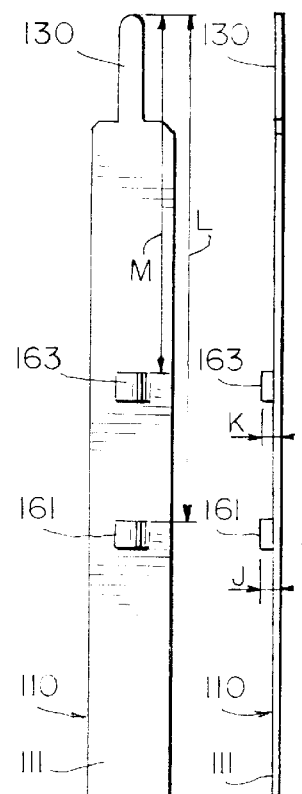
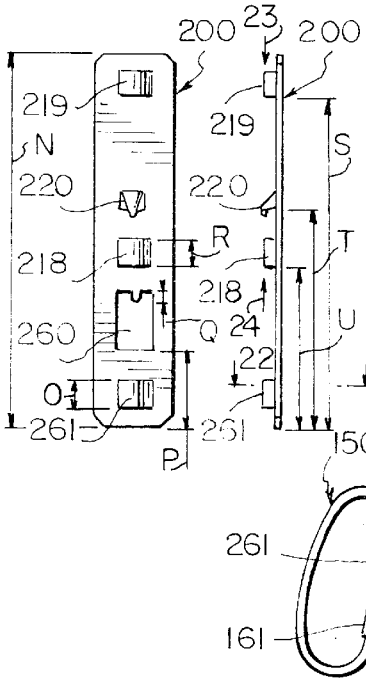
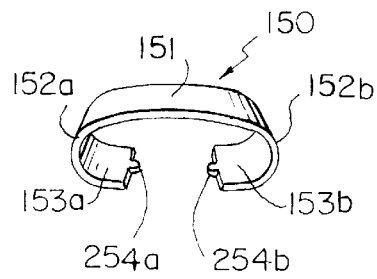
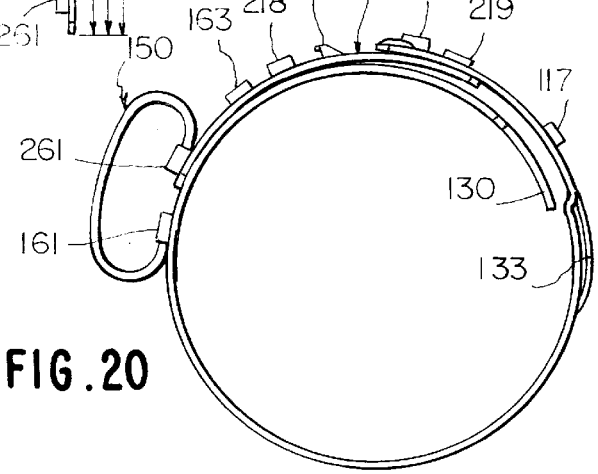
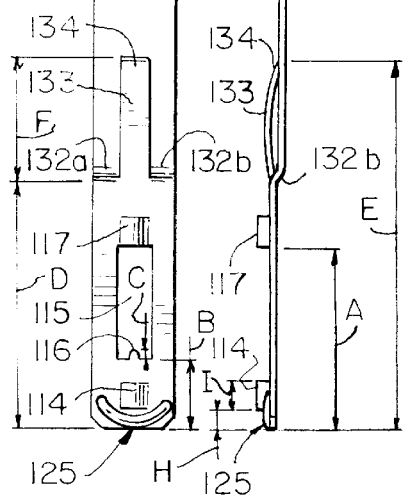
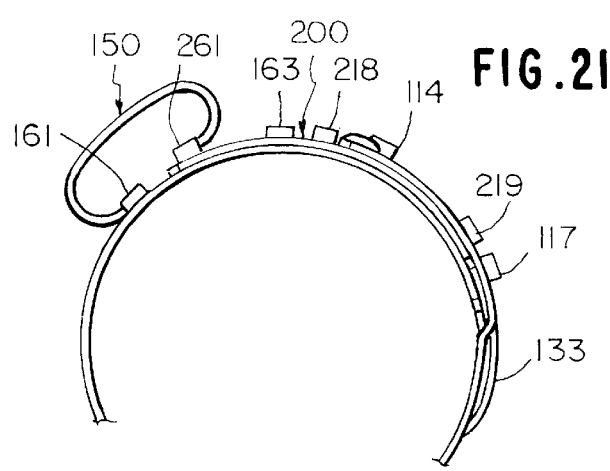

LOW PROFILE EARLESS CLAMP

This application is a continuation-in-part application of my copending Provisional Application Ser. No. 60/020,763, filed on Jun. 28, 1996.

FIELD OF INVENTION

This invention relates to an improved so-called earless stepless clamp structure which is characterized by greater ease of installation as well as by a greater holding reliability in the tightened clamp.

BACKGROUND OF THE INVENTION

So-called low profile or earless and stepless clamp structures are known from my prior U.S. Pat. No. 4,492,004 which first disclosed a clamp structure of this type. My prior U.S. Pat. No. 4,712,278 discloses a modified earless stepless clamp structure which sought to avoid the problem for the requirement of special tools. My U.S. Pat. No. 4,987,651 provides special sections with concavely shaped lateral band portions to overcome the lack of elastic stretchability in the longitudinal direction on the part of the normally used clamping band materials. An arrangement for preventing over-torquing in such types of clamps is disclosed in the U.S. Pat. No. 5,191,684 while my U.S. Pat. No. 5,283,931 discloses an arrangement for tightening and releasing the earless clamp structure and for imparting elasticity in the longitudinal direction to the clamp by one or more undulations.

Clamps of the type disclosed in my prior U.S. Pat. No. 4,492,004, which have enjoyed immense commercial success, require engagement of hooks 12, 13 in apertures 15 at the exact moment when the clamp is in the fully tightened condition. However, during tightening, the free end of the outer band portion of such prior art clamps had a tendency to lift up which required at times extra manipulation to assure engagement of the hooks in the apertures, for example, by manually pressing down the outer band portion. Finally, there is always the desire to improve the holding ability of the clamp structure while simplifying the structural parts necessary therefor in order to decrease cost of manufacture and to simplify ease of installation.

SUMMARY OF THE INVENTION

It is therefore a primary object of the invention to provide a clamp structure which eliminates by simple and cost-effective means the shortcomings mentioned hereinabove.

It is another object of this invention to provide a clamp structure which facilitates tightening of the clamp structure as well as improve its holding ability.

According to one embodiment of this invention, the lifting up of the free end of the outer band portion has been surprisingly minimized in an extraordinarily simple manner by a reinforcement at least partially surrounding the tunnel-shaped embossment member nearest the free end of the outer band portion which is used to tighten the clamp structure by applying a tightening tool at its tool-engaging surface. Moreover, the ease of installation as well as holding ability of the clamp has been improved significantly by a special cold-deformed deep-drawn support hook member in the inner band portion, which includes a ramp-like obliquely outwardly extending surface that now terminates in a substantially flat, longitudinally extending short top portion. The improved support hook offers greater resistance against buckling or collapse of the hook under the load of the outer clamping band portion during tightening and at the same time facilitates the sliding movement of the outer clamping band portion over the novel support hook during tightening. According to a preferred embodiment, the improved support hook of this invention is thereby formed by a part-circular cut in the flat clamping band and thereafter shaping the support hook by cold-deforming and deep-drawing in such a manner that a substantially rectilinear ramp-like rear surface is formed which terminates in a small flat top portion forming a short longitudinally extending nose-like projection for connection with the outer band portion as will be described more fully hereinafter.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIG. 1 is a plan view on one embodiment of an earless clamp structure in accordance with the present invention;

FIG. 2 is a side elevational view of the clamp structure of FIG. 1;

FIG. 3 is a partial axial elevational view showing the clamp structure of FIGS. 1 and 2 in its preassembled condition;

FIG. 4 is a partial plan view on the clamp structure taken in the direction of the arrow in FIG. 3;

FIG. 5 is a partial axial elevational view, similar to FIG. 3, but showing the clamp structure in the fully tightened condition;

FIG. 6 is a partial plan view, similar to FIG. 4, on the clamp structure in the fully tightened position of FIG. 5;

FIG. 15 is a plan view of a modified embodiment of an earless clamp structure for use with an auxiliary spring;

FIG. 16 is a side elevational view of FIG. 15;

FIG. 17 is a plan view on the connecting member used with the clamp structure of FIGS. 15 and 16;

FIG. 18 is a side elevational view of FIG. 17;

FIG. 19 is a perspective view of the auxiliary spring used in the clamp structure of FIGS. 15–18;

FIG. 20 is a an axial elevational view of the clamp structure of FIGS. 15 through 19 in its preassembled condition;

FIG. 21 is a partial axial elevational view, similar to FIG. 20, but illustrating the clamp structure in the fully assembled condition;

DETAILED DESCRIPTION OF THE DRAWINGS

Figure 7:
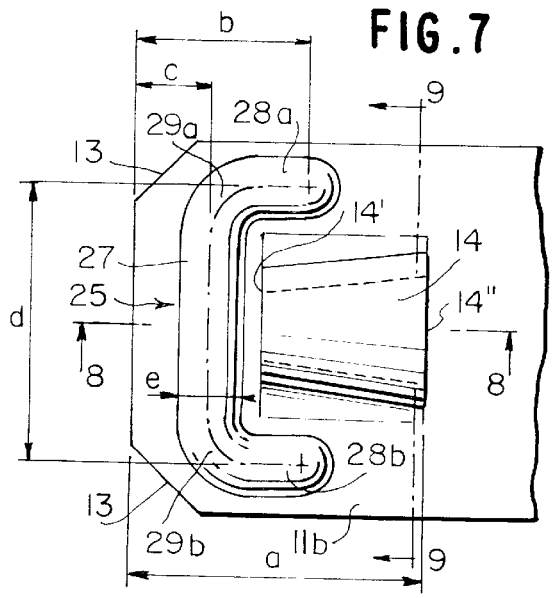
FIG. 7 is a partial plan view, on an enlarged scale, on the end section of the outer band portion with a preferred embodiment of a lift-preventing reinforcement.

Referring now to the drawing wherein like reference numerals are used to designate corresponding parts in the various views, and more particularly to FIGS. 1 through 12, the clamp structure generally designated by reference numeral 10 includes a clamping band 11 made from conventional clamping band material, such as stainless steel or galvanized steel whose inner band portion 11a and outer band portion 11b are intended to overlap in the preassembled and installed positions (FIGS. 3 and 5).

The free end of the outer band portions 11b may be provided with bevelled edges 13, for example, at an angle of 45°—as is also the case at the free end of the inner band portion 11a—and is adjoined in the direction away from the free end by a first tunnel-shaped cold-deformed embossment member 14 of approximately semi-circular shape in transverse cross section which is obtained by deep-drawing after two transverse cuts to form the abutment surfaces 14' and 14". Following the first tunnel-shaped embossment member 14 in the direction away from the free end of the outer band portion 11b is an elongated slot-like opening 15 whose transverse end surface 15' nearer the free end of the outer band portion 11b is provided with a small preassembly projection 16 located centrally in the surface 15'. Next follows a second cold-deformed tunnel-shaped embossment member 17 again obtained by two transverse cuts and subsequent deep-drawing to form the abutment surfaces 17' and 17".

Starting at the end of the inner band portion 11a, there is provided a third tunnel-shaped cold-deformed embossment member 19 also obtained by deep-drawing after two transverse cuts to form the abutment surfaces 19' and 19". Next follows in the direction away from the free end of the inner band portion 11a an improved hook-like support member 20 which also performs a guide function and serves to retain the clamp structure in its completely tightened condition, the details of which will be described more fully hereinafter. Following the hook-like member 20 is a fourth tunnel-shaped cold-deformed embossment member 18 obtained by deep-drawing after two transverse cuts to form abutment surfaces 18' and 18". To realize an internal clamping surface devoid of steps, discontinuities or offsets, particularly at the free end of the inner band portion 11a, the latter is provided with a tongue-like extension 30 adapted to extend through an aperture formed in the outer band portion 11b whereby the aperture commences within the area of two step-like portions 32a and 32b as more fully disclosed in my prior U.S. Pat. Nos. 4,299,012 and 4,315,348. In a preferred embodiment, two longitudinal cuts 33a and 33b are made in the clamping band to obtain a pressed-out channel 33 whereby the two step-like portions 32a and 32b in the outer band portion 11b in which the aperture is located, have a height substantially equal to the thickness of the clamping band so that the remaining lateral band portions 35a and 35b come to lie with their inner clamping surfaces at the radial distance of the inner clamping surface of the clamp structure. The tongue-like extension 30 which is thereby able to extend through the aperture formed in the step-like portions 32a and 32b, can then slide longitudinally in the channel-shaped recess 33 during tightening of the clamp. The tongue-like extension 30 is thereby guided by the inner surface of the outer band portion 11b until extending through the aperture within the step-like portions 32a and 32b as more fully disclosed in my prior U.S. Pat. No. 4,299,012. However, the stepless feature can also be attained as disclosed in my prior U.S. Pat. No. 4,315,348 in which the part forming the cover of the channel-shaped recess 33 is omitted by simply cutting a longitudinal slot out of the outer band portion which commences in the step-like portions 32a and 32b and extends a predetermined distance in the outer band portion away from the free end thereof. In the illustrated embodiment the pressed-out channel-shaped recess 33 thereby terminates in a second step-like portion 34.

The reinforcement generally designated by reference numeral 25 which is located between the tunnel-shaped embossment member 14 and the free end of the outer band portion 11b close to the latter, thereby at least partially surrounds the first tunnel-shaped embossment member 14 in a curvilinear manner as shown in FIGS. 1, 4 and 6. In a preferred embodiment illustrated in FIGS. 7–9, the reinforcement 25 at least partially surrounds the first tunnel-shaped embossment member 14 by a greater amount than in FIG. 1 and for that purpose includes a transversely extending, substantially rectilinear main portion 27 (FIG. 7) and two longitudinally extending lateral portions 28a and 28b which are joined to the transversely extending main portion 27 by way of rounded-off portions 29a and 29b each preferably forming a fourth of a circle. It has been found in a surprising manner that the free end of the outer band portion 11b is less likely to lift up during tightening of the clamp when the corresponding abutment surfaces 14" and 18' of the first and fourth tunnel-shaped members 14 and 18 are engaged by a conventional tightening tool (not shown), as will be explained more fully hereinafter and that the first tunnel-shaped member 14 is thereby also stabilized.

Figure 11:
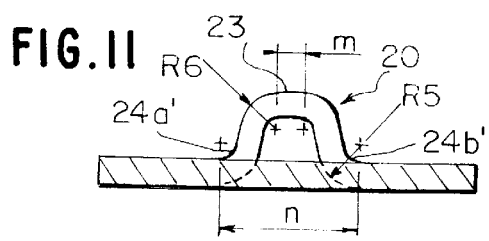
FIG. 11 is an elevational view, taken in the direction of the arrow of FIG. 10.
Figure 10:
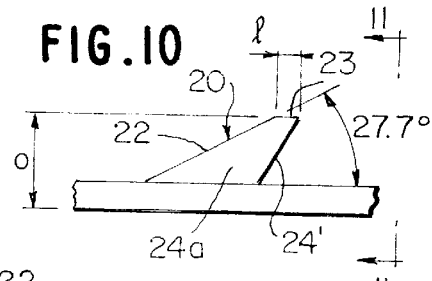
FIG. 10 is an axial side elevational view, on an enlarged scale, of a preferred embodiment of a hook-like member in accordance with this invention.
Figure 12:
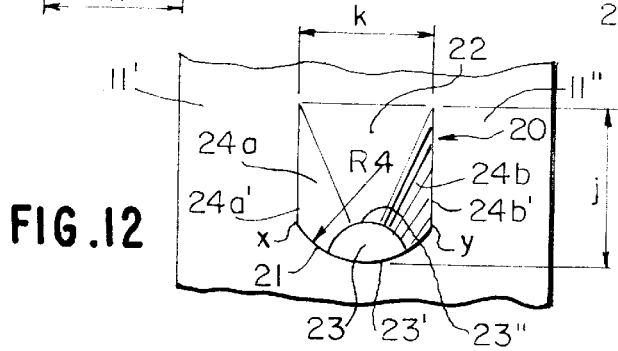
FIG. 12 is a top plan view, on the hook-like member of FIG. 10.

The hook-like member generally designated by reference numeral 20 and illustrated in greater detail on an enlarged scale in FIGS. 10 through 12, is formed by a curvilinear cut 23' extending from point x to point y as shown in FIG. 12, i.e., at the intersections of the part-circular cut 23' with the straight lateral connecting areas 24a' and 24b' of the lateral portions 24a and 24b of the hook-like member 20 with the remaining lateral band portions 11' and 11". After such a cut, the hook-like member 20 is then cold-deformed by deep-drawing to provide a substantially rectilinear ramp-like rear surface 22 adjoined at the upper end by a flat top portion 23 forming a nose-like projection extending in the longitudinal direction of the clamping band away from the free end of the tongue-like extension 30. The hook-like member 20 is thereby so formed by deep-drawing that the ramp-like surface 22 decreases in width from its connection with the clamping band toward the flat top portion 23 while its lateral portions 24a and 24b also taper as seen in FIG. 12. The flat top portion 23 has an approximately semi-circular configuration at its edge 23" (FIG. 12) where the flat top portion 23 is connected with the lateral portions 24a and 24b and with the ramp-like surface 22 so that the inclined edges 24', which can also perform a guide function in addition to the support function, are able to abut at the edge formed by the transverse cut for the first tunnel-shaped embossment member 14 nearer the free end of outer band portion 11b, i.e. at the edge in the clamping band underneath the abutment surface 14'.

This particular shape of the hook-like member 20 has proved to be extraordinarily user-friendly to install the clamp owing to the flat top portion which at the same time greatly strengthens the hook-like member against collapse or buckling at the top end of the inclined surfaces as compared to similar prior art hook-like members without the flat top portion, thereby assuring improved holding abilities with respect to circumferentially directed forces so that a single such hook-like member may even suffice.

Figure 8:
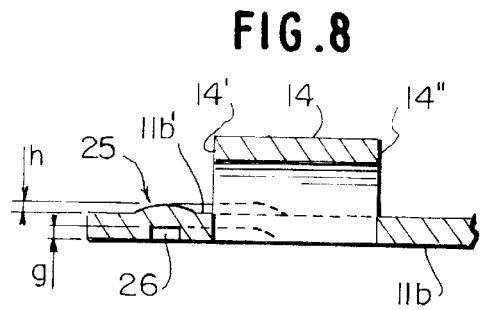
FIG. 8 is a partial cross-sectional view, taken along line 8—8 of FIG. 7.

In operation, the clamp is placed about the object to be fastened with the small projection 16 engaging in the tunnel-shaped embossment 19 to provide preassembly. By applying tightening forces by means of a conventional tool at the abutment surface 14" of the first tunnel-shaped embossment member 14 and at the abutment surface 18' of the fourth tunnel-shaped embossment member 18, the free end of the outer band portion 11b will slide up over the substantially rectilinear inclined ramp-like surface 22 and over the flat top portion 23 of the hook-like member 20 until, in the completely tightened condition, the flat nose-like projection is able to snap-in automatically over the edge in the clamping band underneath the abutment surface 14' of the first tunnel-shaped embossment member 14 to rest on the surface of that outer band end portion indicated in FIGS. 8 and 9 by reference numeral 11b'. This arrangement has proved sufficiently strong so as to obviate the need for the several hook-like members consisting of support hooks and guide hooks as shown in my prior U.S. Pat. No. 4,492,004. My prior U.S. Pat. No. 5,283,931 suggested a support hook engaging at the edge of a tunnel-shaped member. However, the improved ease of installation and enhanced holding ability is attainable only by the flat top portion 23 in accordance with this invention which extends with the nose-like projection a short distance over the outer surface 11b' of the clamping band portion 11b (FIG. 8).

As mentioned above, for purposes of installation, the clamp structure is placed about the object to be fastened and is held in preassembled condition by engagement of the small projection 16 in the third tunnel-shaped embossment member 19. All that is then necessary to tighten the clamp structure is to apply a tightening tool at the abutment surface 14" of the first tunnel-shaped embossment member 14 and at the abutment surface 18' of the fourth tunnel-shaped embossment member 18 so that, after the free end part of the outer band end portion 11b has passed over the surface 22 and the flat top portion 23 of the hook-like member 20, the clamp is automatically installed when the flat hook-shaped top portion 23 of the hook-like member 20 snaps-in over the edge formed by the cut forming the abutment surface 14" at which point the clamp is in the fully engaged position. No other manipulations are normally required to achieve complete tightening. To cause disengagement, it is only necessary to apply the tool at the abutment surface 17' of the second tunnel-shaped embossment member 17 and at the abutment surface 19" of the third tunnel-shaped embossment member 19 to release the clamp for subsequent use. The shapes of the tunnel-shaped embossment members 17 and 19 are thereby such that the tunnel-shaped embossment member 19 can slide underneath the tunnel-shaped embossment member 17 in case of need during reopening of the clamp.

Figure 13:
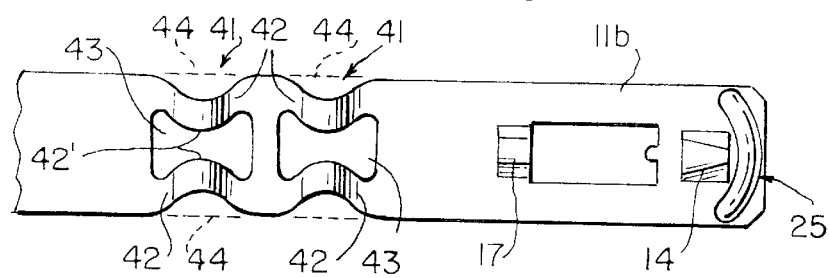
FIG. 13 is a partial plan view on a modified embodiment of an earless clamp structure similar to the embodiment of FIGS. 1 through 12 but provided with a tolerance-compensating arrangement.
Figure 14:
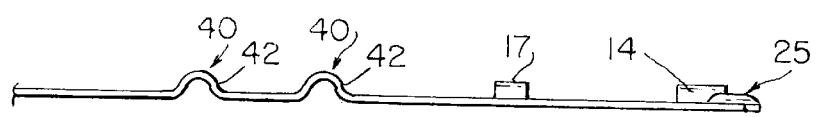
FIG. 14 is a partial side elevational view of FIG. 13.

As the so-called earless clamp structures are normally made from a clamping band material such as stainless steel or galvanized steel with relatively low elastic stretchability in the clamping band longitudinal direction, elastic stretchability may also be imparted to the clamp structure of this invention by any known means. FIGS. 13 and 14 illustrate the use of one or more undulations generally designated by reference numeral 40 and/or one or more sections 41 consisting of lateral band portions 42 of concave shape and forming therebetween a window 43 resembling an hourglass shape. The undulations 40 which may be of any height and configuration are thereby located in this embodiment within the areas of minimum mutual spacing of the lateral band portions 42. However, the undulations 40 may also be located elsewhere and may be used without the sections 41, i.e., one or more undulations 40 within the area of the remaining lateral band portions on both sides of the slot-like opening 15 or, in the alternative, only sections 42 may be provided as also any other known section assuring the elastic stretchability. Furthermore, as stamping out the concavely shaped lateral band portions along the outer surfaces is rather complicated, the sections 41 may also be formed with rectilinear outer sides continuing the normal width of the band portion and only cutting out the hourglass-shaped windows.

FIGS. 15 through 24 illustrate a modified embodiment of an earless stepless clamp structure provided with an auxiliary spring generally designated by reference numeral 150 (FIG. 19) to provide a desired spring path for tolerance compensation. Similar parts in the embodiment of FIGS. 15 through 24 corresponding to those of the embodiment of FIGS. 1 through 12 are designated by corresponding reference numerals of the 100 series and therefore will not be described again in detail. In addition to the clamp structure generally designated by reference numeral 110 consisting of the clamping band 111, the clamp structure of this embodiment includes a separate connecting member generally designated by reference numeral 200 in which those parts functionally similar to those of the embodiment of FIGS. 1 through 12 are designated by corresponding reference numerals of the 200 series. The clamp structure of the embodiment of FIGS. 15 through 24 is again provided with a reinforcement generally designated by reference numeral 125 which is located near the free end of the outer band portion 111b and which may be similar to that illustrated in FIG. 1 or preferably similar to that illustrated in FIGS. 7–9. The separate connecting member 200 includes a support hook member 220 (FIG. 17) similar in construction and operation to the support hook member 20 of the first embodiment. The auxiliary spring generally designated by reference numeral 150, which connects the separate connecting member 200 with the clamping band 111 just ahead of the beginning of overlap, includes a convexly shaped outer portion 151 followed by convexly shaped lateral portions 152a and 152b having smaller radii of curvature than the convexly shaped outer portion 151 and terminating in end portions 153a and 153b which are directed toward one another and are provided at their end faces centrally thereof with projection-like engaging members 254a and 254b, adapted to engage in tunnel-shaped embossment member 261 of the connecting member 200 and in tunnel-shaped embossment member 162 provided in the band portion 111.

The inner band portion 111a is provided with another tunnel-shaped embossment member 163 which is adapted to engage in elongated slot-like aperture 260 in the connecting member 200 to form a limiting means preventing overstressing of the auxiliary spring 150.

Figure 22:
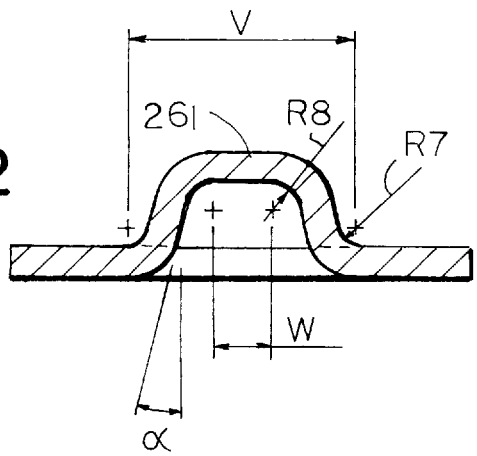
FIG. 22 is a cross-sectional view taken along line 22—22 of FIG. 18.

FIG. 22 illustrates the details of the two similar tunnel-shaped embossment members 261 and 161 (FIGS. 17, 18 and FIGS. 15, 16).

Figure 23:
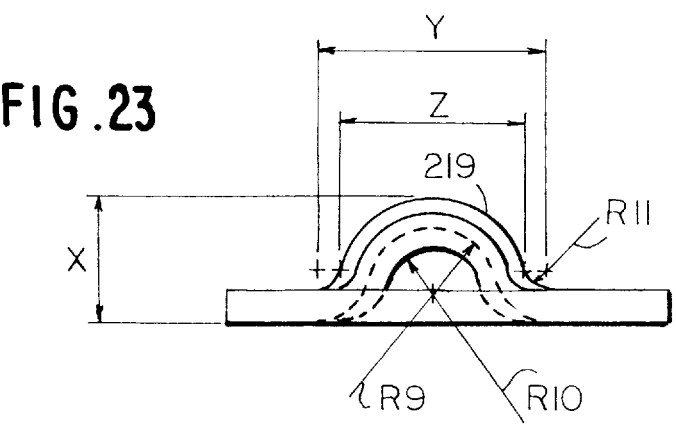
FIG. 23 is an elevational view taken in the direction of arrow 23 in FIG. 18.

FIG. 23 illustrates the details of the two similar tunnel-shaped embossment members 218 and 219 (FIGS. 17 and 18) which are similar to the two tunnel-shaped embossment members 18 and 19 of the first embodiment (FIGS. 1 and 2).

Figure 24:
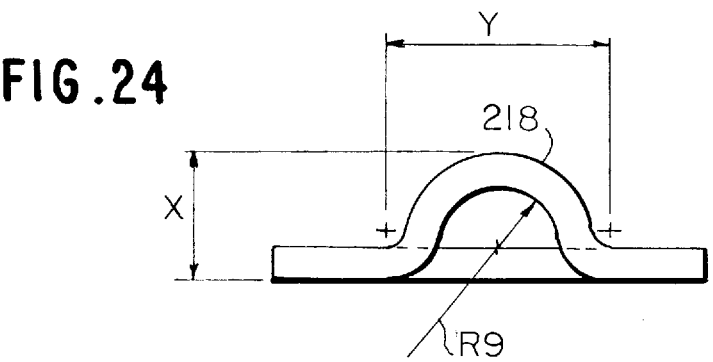
FIG. 24 is an elevational view taken in the direction of arrow 24 in FIG. 18.

FIG. 24 illustrates the details of the two tunnel-shaped embossments 117 and 163 (FIGS. 15 and 16) which are similar to the tunnel-shaped embossment member 17 (FIGS. 1 and 2).

Figure 9:
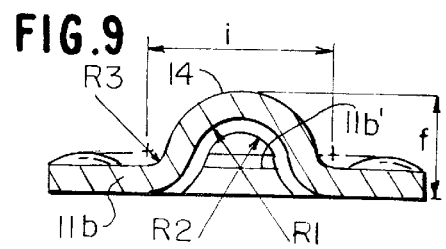
FIG. 9 is a cross-sectional view taken along line 9—9 of FIG. 7.

Details of the hook-like member 220 are shown in FIGS. 10–12 while details of the reinforcement 125 are shown in FIGS. 7–9.

As to the rest, the operation of the embodiment of FIGS. 15 through 24 is similar to the embodiment of FIGS. 1 through 12. Furthermore, the embodiment of FIGS. 15 through 24 may also be provided with some means, as described hereinabove, or as known in the prior art for imparting to the clamping band and/or connecting member an elastic stretchability in the longitudinal direction of the clamping band.

Auxiliary springs interconnecting the overlapping band portions of a clamp structure are shown and described in my prior U.S. Pat. Nos. 5,111,555 and 5,138,747. However, both the particular fastening arrangement of the auxiliary spring structure as well as the absence of a separate connecting member which permits standard sizes of the clamping bands 111 and different lengths of connecting members 200 or vice versa, standard size connecting members and different lengths of clamping bands 111 to achieve various sizes of clamp dimensions is not suggested in these patents not to mention the other features of the clamp structure disclosed herein in connection with FIGS. 15 through 24.

Different types of hooks are known in the prior art such as the support hooks and the guide hooks disclosed in my prior U.S. Pat. No. 4,299,012, the combined guide and support hook as disclosed in my prior U.S. Pat. No. 4,622,720 and hooks with some nose-like portions, as disclosed in my prior U.S. Pat. Nos. 4,492,004 and 5,283,931. However, these prior art patents do not disclose the specific form and features attainable only with of the hook-like members 20 and 220 of this invention.

If so desired, the overtorquing feature as well as the particular construction of the tunnel-shaped members and their tool-engaging arrangements as disclosed in my prior U.S. Pat. No. 5,191,684 may also be incorporated into the various embodiments of the clamp structures as disclosed herein. The clamping band, including the connecting member, may be made of any suitable material such as stainless steel or galvanized steel, as known to those skilled in the art, and having a width and thickness as desired for a given application. The length of the various clamping band members, respectively, connecting members, are dependent on the size of a given clamp and may be chosen as known to those skilled in the art.

Typical values of those parts of the various embodiments which embody features of the invention are as follows, it being understood that these values are only for illustrative purposes and are not to be construed as limitative of this invention which may be varied as known to those skilled in the art. The clamping band material may be AISI 304 stainless steel or X5CrNi 1810 stainless steel with a clamping band width of 12 mm. and a thickness of 0.8 mm. Typical values of one embodiment of the reinforcement 25 and 125 and of the hook-like member 20 and 220 are as follows. The dimension a in FIG. 7 is 9 mm., the dimension b is 5.5 mm., the dimension c is 2.5 mm., the dimension d is 9 mm. and the dimension e is 2 mm. The height dimension f in FIG. 9 is 3.2 mm., the dimension g as well as the dimension h in FIG. 8 are 0.3 mm. The radius R1 in FIG. 9 is 1.1 mm., the radius R2 is 1.7 mm. and the radius R3 is 0.5 mm. The dimension i in FIG. 9 is 5.88 mm. as measured from the centers of the radii of curvature of radii R3.

The dimensions j in FIG. 12 is 5 mm., the dimension k is 4.4 mm., the dimension 1 in FIG. 10 is 0.8 mm., the dimension m in FIG. 11 as measured between the centers of the radii of curvature is 0.98 mm., the dimension n in FIG. 11 is 4.38 mm. and the height dimension o in FIG. 10 is 2.9 mm. The radius of curvature R4 for the cut in the clamping band prior to deep-drawing of the hook-like member 20, 220 from point X to point Y is 2.5 mm., the radius of curvature of R5 in FIG. 11 is 1.3 mm. and the radius of curvature R6 is 1.1 mm. The angle subtended by the rectilinear ramp-like surface 232a and the plane of the clamping band as shown in FIG. 10 is 27.7°. The length of opening 15, 115 may be 9 mm. and its width may be 6 mm. whereby the projection 16 is centrally located in the surface 15' and has a width of 1.4 mm. and terminating in a semi-circle of 0.7 mm.

In the embodiment of FIGS. 15–24, the following are typical examples of values for the various dimensions, it being understood that these values are set forth only for illustrative purposes but are not to be construed as limitative as these values may be varied, as known to those skilled in the art. The clamping band 111 of FIGS. 15 through 24 has a width of, for example, 12 mm. with a length of the slot 260 in the connecting member of about 9 mm. and a width of about 6 mm. In FIG. 15, the dimension A is 30 mm., the dimension B is 12 mm., the dimension C is 1.2 mm. and the dimension D is 38 mm. while the dimension E is about 55 mm. and the dimension F is about 17 mm. The length of the tongue-like portion 130 should thereby not exceed the dimension F. In FIG. 16, the thickness of the clamping band G is 0.8 mm., the dimension H is 4 mm. and the dimension I is 5 mm. The height J of the tunnel-shaped embossment member 163 is 3.3 mm., and the height K of the tunnel-shaped embossment member 162 is 3.2 mm. The dimension L in FIG. 15 is 81 mm. and the dimension M is 58 mm. The overall length N of the connecting member 200 is 57 mm., the length O of the tunnel-shaped embossment member 261 is 4 mm. the dimension P is 11 mm., the dimension Q is 1.2 mm., the length R of the tunnel-shaped embossment member 218 is 4 mm. as also the length of the tunnel-shaped embossment member 219. The dimension S in FIG. 18 is 51 mm., the dimension T is 31.5 mm. and the dimension U is 23 mm. The dimension V in FIG. 22 is 5.88 mm. and the radius R7 is 0.5 mm. and the radius R8 is 0.8 mm. while the distance W between the two centers for the radii of curvature is 1.43 mm. and the angle $\alpha$ is 11.5°. In FIG. 23, the radius R9 is 1.7 mm., the radius R10 is 1.2 mm., the radius R11 is 0.5 mm., the height X is 3.2 mm., the distance Y is 5.88 mm. and the distance Z is 4.85 mm. In FIG. 24, the distances X and Y are the same as in FIG. 23 and the radius R9 is the same also as in FIG. 23.

Dimensions of the various embodiments of the clamp structures of this invention which have not been specifically mentioned are well within the scope of those skilled in the art, particularly from pre-existing clamp structures which are commercially available in different sizes. As mentioned before, the undulations 40 may be of any desired height, for example 3 mm. from the bottom surface of the clamping band to the top surface of the undulation 40 with a radius of curvature of, for example, 1.4 mm. to provide the desired elastic stretchability that can be readily determined for a given material.

The features of the present invention are also applicable to clamps without the stepless feature. In that case, turning to the embodiment of FIGS. 1 and 2, it is only necessary to omit the tongue-like extension 30 as well as the step-like portions 32a and 32b together with the channel-shaped recess 33. Whereas the dimension from the free end of the tongue-like extension 30 to the edge of the tunnel-shaped embossment member 19 away from the free end of the inner band portion 11a in FIG. 1 was typically 37 mm., the dimension from the free end of the inner band portion 10a to the same edge of the tunnel-shaped member 19 may now be made 18 mm. in a clamp similar to FIGS. 1 and 2 without the stepless feature. Again, whereas the dimension from the free end of the tongue-like extension 30 to the forward-most edge of the flat top portion 23 in the embodiment of FIGS. 1 and 2 was 56 mm., the dimension from the free end of the inner band portion to the same edge may now be made 34 mm. in the clamp without stepless feature. The dimension from the free end of the tongue-like extension 30 to the abutment surface 18' in tunnel-shaped embossment member 18 in FIGS. 1 and 2 may be changed from 65 mm. in the embodiment of FIGS. 1 and 2 to a dimension of 43 mm. in the analogous clamp structure without the stepless feature. As to the rest, the dimensions of such a clamp are the same as in the embodiment of FIGS. 1 and 2.

In the embodiment of FIGS. 15, 16, 17 and 18, it is only necessary to eliminate the tongue-like extension 130, the step-like portions 132a and 132b and the channel-shaped recess 133 if the stepless feature is not needed in this embodiment.

While I have shown and described only several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An earless clamp structure, comprising clamping band means having overlapping inner and outer band portions in the installed condition of the clamp, and means for tightening said clamp structure about an object to be fastened by the application of a tool at tool-engaging surface means and for mechanically connecting the overlapping band portions in the completely tightened condition of the clamp structure, said means for tightening the clamp structure and for mechanically connecting overlapping band portions of the clamping band means including tool-engaging surface means formed at least in part by tunnel-shaped embossment means and hook-like means in the inner band portion operable to engage in hook-receiving means in the outer band portion, characterized in that the hook-like means comprises a hook-like member in the inner band portion in the area near the free end thereof, said hook-like member being deep drawn after an at least approximately part-circular cut in the area thereof away from the free end of the inner band portion, said hook-like member being substantially integral with the clamping band means except within the area of said cut and forming by deep-drawing a substantially ramp-like rear surface extending obliquely upwardly in the direction away from the free end of the inner band portion and provided at its tip with a small flat top portion whose free end is in the shape of said cut and extends substantially in the longitudinal direction of the clamping band means to engage over an edge formed by a transverse cut in the outer band portion.

2. A clamp structure according to claim 1, characterized by reinforcing means in the area of the free end of the outer band end portion to prevent lifting up of the free end of the outer band portion during tightening of the clamp structure.

3. A clamp structure according to claim 2, characterized in that said reinforcing means is in the form of a pressed-out groove-like embossment means extending over nearly the entire width of the clamping band means.

4. A clamp structure according to claim 3, characterized in that said reinforcing means is of generally curvilinear shape with the two lateral end portions pointing in a direction opposite the free end of the outer band portion.

5. A clamp structure according to claim 3, characterized in that said reinforcing means includes a substantially transversely extending main portion and two substantially longitudinally extending lateral portions interconnected with said main portion by way of part-circular portions.

6. A clamp structure according to claim 1, characterized in that the clamp structure is a stepless clamp devoid of any step or offset along its inner clamping surface and includes a tongue-like extension at the free end of the inner band portion adapted to slidingly engage through an aperture in the outer band portion which commences within the area of two lateral step-like portions in the outer band portion.

7. A clamp-like structure according to claim 1, characterized in that the clamp structure includes, starting from the free end of the outer band portion, a reinforcing means, a first tunnel-shaped embossment means forming tool-engaging surface means, an elongated opening, a second tunnel-shaped embossment means forming tool-engaging surface means, and starting from the free end of the inner band portion, a third tunnel-shaped embossment means forming tool-engaging surface means, said hook-like means and a fourth tunnel-shaped embossment means forming tool-engaging surface means.

8. A clamp structure according to claim 7, wherein the tool-engaging surface means on said first tunnel-shaped embossment means on the side opposite the free end of the outer band portion and the tool-engaging surface means on said fourth tunnel-shaped embossment means opposite the free end of the inner band portion form tool-engaging surface means for tightening the clamp.

9. A clamp structure according to claim 8, characterized in that the tool-engaging surface means on said third tunnel-shaped embossment means opposite the free end of the inner band end portion and the tool-engaging surface means on said second tunnel-shaped embossment means opposite the free end of said outer band end portion form tool-engaging surface means for releasing the clamp structure from its tightened position.

10. A clamp structure according to claim 7, wherein said elongated opening is provided with a small projection at its transverse edge nearer the free end of the outer band end portion and extending in a direction away from the free end of the outer band portion for engagement with said third tunnel-shaped embossment means to establish a preassembly position.

11. A clamp structure according to claim 7, in which the clamping band means is made of a material substantially devoid of any elastic stretchability in the clamping band longitudinal direction, characterized by means for imparting elastic stretchability to the clamping band means.

12. A clamp structure according to claim 11, characterized in that said means for imparting elastic stretchability includes an auxiliary spring interconnected between a connecting member and the clamping band means shortly ahead of the beginning of overlap, and in that the connecting member includes said hook-like means as well as said third tunnel-shaped means and said fourth tunnel-shaped means.

13. A clamp structure according to claim 7, characterized in that the clamp structure is a stepless clamp devoid of any step or offset along its inner clamping surface and includes a tongue-like extension at the free end of the inner band portion adapted to slidingly engage through an aperture in the outer band portion which commences within the area of two lateral step-like portions.

14. A clamp structure according to claim 13, characterized by reinforcing means in the area near the free end of the outer band end portion to prevent lifting up of the free end of the outer band portion during tightening of the clamp structure.

15. A clamp structure according to claim 14, characterized in that said reinforcing means includes a substantially transversely extending main portion and two substantially longitudinally extending lateral portions interconnected with said main portion by way of part-circular portions.

16. A clamp structure according to claim 13, wherein said step-like portions are located in the clamping band means at a distance from the tool-engaging surface means of said second embossment means in a direction away from the free end of the outer band portion.

17. A clamp structure according to claim 16, wherein said lateral portions of said reinforcing means extend at least in part in the longitudinal direction on both sides of said first tunnel-shaped embossment means.

18. A clamp structure according to claim 1, in which the clamping band means is made of a material substantially devoid of any elastic stretchability in the clamping band longitudinal direction, characterized by means for imparting elastic stretchability to the clamping band means.

19. A clamp structure according to claim 18, characterized in that said means for imparting elastic stretchability includes at least one section having a window in the center area thereof which has a shape resembling an hourglass.

20. A clamp structure according to claim 19, characterized in that said means for imparting elastic stretchability includes at least one section having lateral band portions which are concavely shaped in such a manner as to form the hourglass-like shaped window.

21. A clamp structure according to claim 20, characterized in that said means for imparting elastic stretchability includes undulation means in the clamping band means.

22. A clamp structure according to claim 21, characterized in that said undulation means are located within the throat area of the hourglass-like window.

23. A clamp structure according to claim 18, characterized in that said means for imparting elastic stretchability includes undulation means in the clamping band means.

24. A clamp structure according to claim 18, characterized in that said means for imparting elastic stretchability includes an auxiliary spring interconnected between a connecting member and the clamping band means shortly ahead of the beginning of overlap, and in that the connecting member includes said hook-like means.

25. A clamp structure according to claim 24, characterized by means for limiting the maximum tensional forces to which the auxiliary spring can be subjected.

26. A clamp structure according to claim 25, characterized in that said limiting means includes an elongated opening in the connecting member through which extends a further tunnel-shaped embossment means in the outer band portion.

27. A clamp structure according to claim 24, characterized in that said auxiliary spring includes a main portion connected to mutually substantially oppositely directed end portions by way of convexly shaped lateral portions, said end portions being provided with finger-like projections operable to engage in tunnel-shaped embossment means provided in the clamping band means within the area just ahead of the overlap and in the connecting member.

28. An earless clamp structure according to claim 1, wherein said ramp-like rear surface passes over directly into said flat top portion.

29. An earless clamp structure according to claim 1, wherein said ramp-like rear surface is substantially rectilinear.

30. An earless clamp structure according to claim 1, wherein said small flat top portion is of substantially constant thickness corresponding to the thickness of the clamping band means.

31. An earless clamp structure, comprising clamping band means having overlapping inner and outer band portions in the installed condition of the clamp, and means for tightening said clamp structure by the application of a tool at tool-engaging surface means and for mechanically connecting the overlapping band portions in the completely tightened condition of the clamp structure, said means for tightening the clamp structure and for mechanically connecting overlapping band portions of the clamping band means including tool-engaging surface means formed at least in part by tunnel-shaped embossment means and hook-like means in the inner band portion operable to engage in hook-receiving means in the outer band end portion, characterized by reinforcing means in the area of the free end of the outer band portion to prevent lifting up of the outer band end portion during tightening of the clamp structure, said reinforcing means being in the form of an embossment means.

32. A clamp structure according to claim 31, characterized in that said reinforcing means is in the form of a pressed-out groove-like embossment means extending from side-to-side in the area near the free end of the outer band portion of the clamping band means.

33. A clamp structure according to claim 31, characterized in that said reinforcing means is of generally curvilinear shape with the two lateral ends pointing in a direction opposite the free end of the outer band portion.

34. A clamp structure according to claim 31, characterized in that said reinforcing means includes a substantially transversely extending main portion and two substantially longitudinally extending lateral portions interconnected with said main portion.

35. A clamp-like structure according to claim 31, characterized in that the clamp structure includes, starting from the free end of the outer band portion, said reinforcing means, a first tunnel-shaped embossment means forming tool-engaging surface means, an elongated opening, a second tunnel-shaped embossment means forming tool-engaging surface means, and starting from the free end of the inner band portion, a third tunnel-shaped embossment means forming tool-engaging surface means, a hook-like means forming part of the mechanical connecting means, and a fourth tunnel-shaped embossment means forming tool-engaging surface means.

36. A clamp structure according to claim 35, characterized in that the clamp structure is a stepless clamp devoid of any step or offset along its inner clamping surface and includes a tongue-like extension at the free end of the inner band portion adapted to slidingly engage through an aperture in the outer band portion which commences within the area of two lateral step-like portions.

37. A clamp structure according to claim 36, wherein said step-like portions are located in the clamping band means at a distance from the tool-engaging surface means of said second embossment means in a direction away from the free end of the outer band portion.

38. An earless clamp structure, comprising clamping band means having overlapping inner and outer band portions in the installed condition of the clamp, and means for tightening said clamp structure about an object to be fastened by the application of a tool at tool-engaging surface means and for mechanically connecting the overlapping band portions in the completely tightened condition of the clamp structure, said means for tightening the clamp structure and for mechanically connecting overlapping band portions of the clamping band means including tool-engaging surface means formed at least in part by tunnel-shaped embossment means and hook-like means in the inner band portion operable to engage in hook-receiving means in the outer band portion, characterized in that the hook-like means comprises a hook-like member in the inner band portion in the area near the free end thereof, said hook-like member being deep drawn after a part-circular cut in the area thereof away from the free end of the inner band portion, said hook-like member being substantially integral with the clamping band means except within the area of the part-circular cut and forming by deep-drawing a substantially ramp-like rear surface extending obliquely upwardly in the direction away from the free end of the inner band portion and provided at its tip with a small flat top portion extending substantially in the longitudinal direction of the clamping band means to engage over an edge formed by a transverse cut in the outer band portion, said ramp-like rear surface of said deep-drawn hook-like member increasing in width from said small top portion to the area of its connection with the clamping band means.

39. A clamp structure according to claim 38, characterized in that the hook-like member forms a substantially rectilinear ramp-like surface, as viewed in the axial direction of the clamp structure, which extends from the tip of the flat top portion to the plane of the clamping band means.

40. An earless clamp structure according to claim 38, wherein said ramp-like rear surface is substantially rectilinear.

* * * * *